United States Patent [19]

Urano et al.

[11] Patent Number: 4,880,892

[45] Date of Patent: Nov. 14, 1989

[54] COMPOSITION COMPRISING AN EPOXY RESIN, A PHENOL AND AN ADVANCEMENT CATALYST

[75] Inventors: Wataru Urano, Kawanishi; Yasuaki Sugano, Takarazuka, both of Japan

[73] Assignee: Ciba-Geigy Corporation, Ardsley, N.Y.

[21] Appl. No.: 234,779

[22] Filed: Aug. 22, 1988

[30] Foreign Application Priority Data

Aug. 31, 1987 [JP] Japan .................................. 62-216991

[51] Int. Cl.$^4$ ........................ C08G 59/68; C08G 59/62
[52] U.S. Cl. ...................................... 528/89; 525/507; 528/94
[58] Field of Search ...................... 525/507; 528/89, 94

[56] References Cited

U.S. PATENT DOCUMENTS

| | | | |
|---|---|---|---|
| 3,477,990 | 11/1969 | Dante et al. | 528/104 X |
| 3,634,323 | 1/1972 | Moran | 528/104 X |
| 3,738,862 | 6/1973 | Klarquist et al. | 528/89 X |
| 3,931,109 | 1/1976 | Martin | 528/89 X |
| 4,320,222 | 3/1982 | Lopez | 528/89 |
| 4,389,520 | 1/1983 | Gannon | 528/89 |
| 4,438,254 | 3/1984 | Doorakian et al. | 528/89 |
| 4,634,757 | 1/1987 | Marshall et al. | 528/89 |

FOREIGN PATENT DOCUMENTS 60-144324 7/1985 Japan .
1398197 6/1975 United Kingdom .

*Primary Examiner*—Earl Nielsen
*Attorney, Agent, or Firm*—Stephen V. O'Brien

[57] ABSTRACT

Advancement catalysts which are a combination of a phosphonium halide or an alkylene phosphorane and a nitrogen heterocycle selected from the group consisting of substituted or unsubstituted imidazoles, benzimidazoles, imidazolines, dihydropyrimidines, tetrahydropyrimidines, dihydroquinazolines, their salts and mixtures thereof, confer high reactivity and selectivity on epoxy resin advancement reactions. The advanced epoxy resins are useful in the preparation of coatings of high quality.

21 Claims, No Drawings

COMPOSITION COMPRISING AN EPOXY RESIN, A PHENOL AND AN ADVANCEMENT CATALYST

The invention relates to compositions comprising an epoxy resin, a mononuclear or polynuclear phenol having at least two phenolic hydroxyl groups and an advancement catalyst which is a combination of a phosphonium halide or an alkylene phosphorane with certain nitrogen heterocycles, as well as to an improved process for advancing an epoxy resin with a phenol by using said advancement catalyst.

Hitherto, polyhydroxy ethers, that is products of an advancement reactions of epoxy resins with phenols, have generally been produced by reacting a dihydric phenol with epichlorohydrin in the presence of an alkali to form a low molecular weight epoxy resin, followed by treating said epoxy resin with a special aqueous solution to remove soluble inorganic matter, adding an additional amount of dihydric phenol and a catalyst to the low molecular weight epoxy resin thus treated, and carrying out an advancement reaction. Various processes for advancing epoxy resins with phenols employing a variety of advancement catalysts are known.

U.S. Pat. No. 3,634,323 describes the reaction of epoxy resins with dihydric phenols in the presence of imidazoles, benzimidazoles, imidazolines, dihydropyrimidines, tetrahydropyrimidines or dihydroquinazolines as catalysts.

Phosphonium halide salts as catalysts for the advancement reaction are disclosed, for example in US 3,477,990.

Reactions of epoxy resins with phenolic compounds in the presence of a catalyst selected from the group consisting of phosphonium salts of organic and inorganic acids, imidazoles, imidazolines and quaternary ammonium compounds are described in US 3,931,109. The use of combinations of said catalysts is neither disclosed nor suggested.

GB 1,398,197 discloses the use of alkylene phosphoranes as catalysts for the advancement of epoxy resins with dihydric and polyhydric phenols. U.S. Pat. No. 4,389,520 discloses the use of formylmethylenetriphenylphosphorane and formylmethyltriphenylphosphonium halides as catalysts for advancement reactions.

Japanese patent Kokai Sho 60-144,324/1985 describes a catalyzed reaction of a polyepoxide with a polynuclear dihydric phenol characterized by using 0.1–5% by weight of a phosphonium salt and 0.001–1% by weight of an alkali metal hydroxide or an alkaline earth metal hydroxide as catalyst.

When using epoxy resins, for example as can coating materials and particularly coating materials used in the sanitary cans for foodstuffs, it is desired to minimize the extraction of the constituents of inner coating into the content of the can. From this point of view, it is desired to decrease the low molecular weight fraction of the polyhydroxy ether used in the can coating material and to improve the processability of the polyhydroxy ether, and hence it is desired to obtain a polyhydroxy ether having a high molecular weight. Further, it is also desired to realized as sharp a molecular weight distribution of polyhydroxy ether as possible in order to facilitate the modification of high molecular weight polyhydroxy ether as a precursor and to enhance its solubility in solvents.

Among the above-mentioned catalysts, those other than phosphines and phosphonium salts catalyze not only the intended reaction between the epoxide group and the phenolic hydroxyl group but also undesirable competitive side reactions such as the reaction between the epoxide group and the alcoholic hydroxyl group:

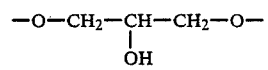

formed by the reaction between the epoxide group and the phenolic hydroxyl group, the homopolymerization of epoxide groups, and the like. Consequently, the product is a mixture of various polymeric resins of different molecular weight and having various side chains and terminal functional groups. Such a diversity reduces the quality and the practicability of the product and is therefore disadvantageous.

As a method for preparing a polyhydroxy ether having a controlled molecular weight distribution, the method of using phosphonium halides has already been proposed. Although this method prevents the above-mentioned side reactions, it is disadvantageous in that the reaction takes a long period of time and thereby lowers the productivity, and in that a polymer resin having a sufficiently high molecular weight is difficult to obtain by this method. Polyhydroxy ethers having a sufficiently high molecular weight can be obtained by this method only by using a large amount of catalyst. However, if a large amount of catalyst is used, the catalyst itself can be extracted as low molecular weight impurity, which reduces the quality of product. Further the use of such a large amount of catalyst is economically disadvantageous.

In general high molecular weight resins are produced by solution polymerization. Solution polymerization is advantageous in that the reaction progresses at relatively low temperature so that it can give a straight chain polymer without the formation of a gel, even more so if phosphonium halides are used as catalysts. On the other hand, solution polymerization is disadvantageous in that the reaction unavoidably requires a very long period of time.

The present invention has been made in view of the above. The object of the present invention is providing an improved process for producing polyhydroxy ethers having a high molecular weight and a sharp molecular weight distribution in a very short period of time and with high efficiency.

With the aim of solving the above-mentioned problems, it was found that a high molecular weight polyhydroxy ether having a controlled molecular weight distribution can be produced with a small amount of catalyst in a short reaction time if a polyepoxide and a mononuclear or polynuclear phenol are reacted in the presence of an effective amount of a combined catalyst consisting of a phosphonium halide or an alkylene phosphorane and of certain nitrogen heterocycles.

Subject of the invention is a composition which comprises
(a) an epoxy resin having on average more than one epoxy group per molecule,
(b) a mononuclear or polynuclear phenol having at least two phenolic hydroxyl groups per molecule and
(c) a small, but effective catalytic amount of a catalyst which is a combination of
 (c1) a phosphonium halide or alkylene phosphorane and (c2) a nitrogen heterocycle selected from the group consisting of substituted or unsubstituted imidazoles, benzimidazoles, imidazolines, dihydropyrimidines, tetrahydropyrimidines, dihydroquinazolines, their salts with organic or inorganic acids and mixtures thereof.

The epoxy resin used according to the invention may be any polyepoxide so far as it has on the average, two or more of 1,2-epoxy groups in one molecuole. It is preferably liquid at room temperature. It may be any of saturated and unsaturated, aliphatic, alicyclic, aromatic and heterocyclic epoxides. If desired, it may have a non-hindering substituent such as halogen atom, hydroxyl group, ether group, ester group and the like. Examples of said polyepoxide include epoxy novolac resins; polyglycidyl ethers of dihydric phenols such as 2,2-bis(4-hydroxyphenyl)propane, 1,1-bis(4-hydroxyphenyl)ethane, bis(4-hydroxyphenyl)methane, bis(4-hydroxyphenyl)sulfone, resorcinol and hydroquinone; polyglycidyl ethers of trihydric alcohols such as glycerin; polyglycidyl esters such as diglycidyl phthalate and diglycidyl isophthalate; epoxidized esters of polyethylnically unsaturated fatty acids such as epoxidized linseed oil; epoxidized esters of unsaturated alcohols and unsaturated carboxylic acids such as 3,4-epoxycyclohexylmethyl 3,4-epoxycyclohexylcarboxylate; and epoxidized polyethylenically unsaturated hydrocarbons such as epoxidized 2,2-bis(2-cyclohexenyl)propane, epoxidized vinylcyclohexane, epoxidized cyclopentadiene dimer, and the like. Among these polyepoxides, polyglycidyl ethers of polyhydric phenols and especially diglycidyl ethers of dihydric phenols are preferred. Particularly preferred as component (a) is the diglycidyl ether of 2,2-bis(4-hydroxyphenyl)propane.

The epoxy resin component (a) has preferably an epoxy equivalent weight in the range of 180–200 g/equivalent.

The mononuclear or polynuclear phenol (b) used according to the invention may be any mononuclear or polynuclear phenol, so far as it has at least two phenolic hydroxyl groups. It may have any kind of other substituent in any number so far as it is inert towards the epoxy group. For example, the phenols to which the present invention is applicable are compounds represented by the following formulae:

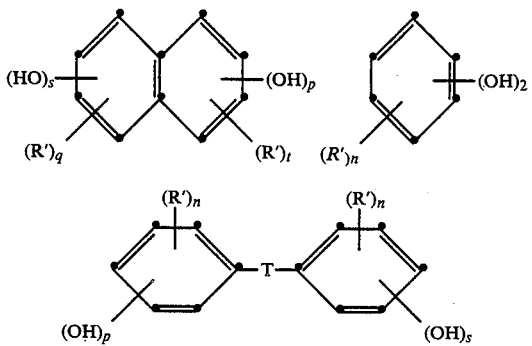

wherein

R' may be hydrogen lower alkyl having 1 to 7 carbon atoms (e.g. methyl, propyl, t-butyl), halogen (e.g. bromo, chloro), aryl (e.g. phenyl, naphthyl), lower alkaryl group (its aryl moiety may be for example phenyl or naphthyl, and its alkyl moiety may be alkyl having 1 to 7 carbon atoms such as methyl, propyl and the like, aryl-(lower alkyl) (e.g. phenyl- and naphthyl-(lower alkyl) wherein alkyl is from 1–7 carbon atoms such as methyl, propyl, t-butyl and the like), cycloalkyl (e.g. cyclopentyl, cyclohexyl), cycloalkyl-alkyl (e.g. cyclopentyl or cyclohexyl-alkyl of 1–7 carbon atoms, such as methyl, propyl, t-butyl and the like), alkoxy (e.g. having 1 to 20 carbon atoms, perferably 1 to 7 carbon atoms, such as methoxy, propoxy, 2-methoxyoctyl and the like), alkenyl (e.g. having 2 to 20 carbon atoms and preferably 2 to 7 carbon atoms, such as propen-1-yl, buten-2-yl and the like), and phenoxy;

T may be a bond between two phenyl rings (i.e. to form a biphenyl moiety or oxygen, sulfur, —NH—, —SO$_2$—, a straight or branched chain lower alkylene having 1 to 10 carbon atoms (e.g. hexylene, methylene and the like), phenylmethylene or tolylmethylene;

n, q and t may be integers of from 0 to 3, provided that when one of q and t is equal to 3 the other is less than 2; and p and s being an integer of from 0 to 2, provides that the sum of p and s is not smaller than 2.

In a preferred aspect of the invention the dihydric phenols are those wherein R' is hydrogen, bromine or lower alkyl, T is methylene or isopropylene, n, q and t are each integers of from 0 to 2, and p and s are each 1. Preferred dihydric phenols are also those of the following formula:

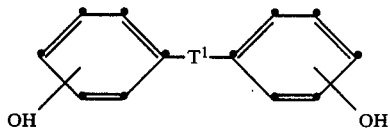

with T$^1$ being a bond between the two phenyl rings, O, S, SO$_2$, NH, CH$_2$ or C(CH$_3$)$_2$. The dihydric phenols particularly suitable in the practice of the invention include 2,2-bis(4-hydroxyphenyl)propane (bisphenol A), resorcinol, 1,4-dihydroxynaphthalene, 2,2-bis(4-hydroxy)methane (bisphenol F), bis(4-hydroxyphenyl)sulfone, tetrabromo- and tetrachlorobisphenol A, pyrocatechol, hydroquinone, bis(4-hydroxyphenyl)methylphenyl-methane, bis(4-hydroxyphenyl)-tolyl-methane, 4,4'-dihydroxybiphenyl, phenolphthalin and 4,4'-dihydroxy-3,3',5,5'-tetramethylbiphenyl. Among them, particularly preferred is bis(4-hydroxyphenyl)methane and 2,2-bis(4-hydroxyphenyl)propane.

The dihydric phenols that are reacted with the epoxy resin according to the process of this invention can be the same or different from the dihydric phenol used to prepare the 1,2-epoxy resin component. For example, the diglycidyl ether of bisphenol A can be reacted with bisphenol A or with resorcinol.

In the invention, the relative amounts of the above-mentioned polyepoxide and the mononuclear or polynuclear dihydric phenols may be appropriately varied in a wide range based on the desired properties of the product, i.e. based upon the extent of advancement desired. Usually, they are used in such a proportion that the amount of dihydric phenol is 0.4 to 2.5 equivalents and preferably 0.8 to 1.25 equivalents, per 1 equivalent of polyepoxide. Most preferably the amounts of components (a) and (b) used according to the invention are such that the amount of the phenol component (b) contains 0.85 to 0.95 hydroxy equivalents per 1 epoxy equivalent of component (a).

In general the advancement reaction according to the invention is effected in a temperature range of from about 100 to about 250° C., preferably from about 150 to about 200° C.

Contrary to other methods which employ inorganic bases, in the process of this invention it is not necessary to remove or deactivate the catalyst after reaction, for residual catalyst does not affect subsequent product performance.

According to the invention, the reaction between the polyepoxide and the phenol is carried out in the presence of the catalyst, either in the melt or in the presence of a solvent. If solid reactants are used and/or highly viscous products are formed, the presence of inert solvents may be of advantage. Examples of inert solvents which may be used are xylene, toluene, methyl isobutyl ketone, ethylene glycol diethyl ether, cyclohexanone, dibutyl ether and butyl acetate. Mixtures of these solvents can also be used.

The catalyst component (c1) according to the invention is preferably a compound of the formulae I or II

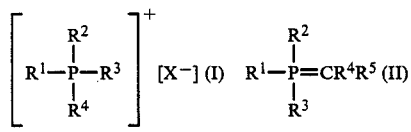

wherein X is a halogen atom, such as chlorine, bromine or iodine, $R^1$, $R^2$ and $R^3$ are the same or different and represent hydrocarbon groups containing from 1 to 25 carbon atoms and $R^4$ and $R^5$ are the same or different and represent a hydrogen atom or a hydrocarbon group containing from 1 to 20 carbon atoms, which hydrocarbon group may optionally contain one or more groups selected from carbonyl groups, carboxylic acid ester groups and carboxylic acid amide groups, and wherein, when each of $R^4$ and $R^5$ represents a hydrocarbon group, $R^4$ and $R^5$ together may form a ring.

$R^1$, $R^2$ and $R^3$ are identical or different and each represents a monovalent hydrocarbon group, i.e. alkyl, cycloalkyl, aryl, alkaryl or arylalkyl group all having at most 25 carbon atoms and preferably those having 1 to 18 carbon atoms such as phenyl, butyl, lauryl, hexadecyl, cyclohexyl, benzyl or phenethyl group.

The groups $R^1$, $R^2$ and $R^3$ are preferably identical and represent hydrocarbon groups containing 1 to 18 carbon atoms. Most preferably $R^1$, $R^2$ and $R^3$ are phenyl.

The groups $R^4$ and $R^5$ in the compounds of formulae I or II according to the invention independently of one another preferably represent a hydrogen atom or a hydrocarbon group containing from 1 to 10 carbon atoms.

Preferably the phosphonium salt of formula I and the alkylene phosphorane of formula II contain a carbonyl group in the 8-position to the phosphorus-carbon bond, as these alkylenephosphoranes are particularly stable.

Examples of the above-mentioned alkylene phosphoranes or phosphonium salts (c1) include, among others tetraphenylphosphonium chloride, tetraphenylphosphonium iodide, benzyltriphenylphosphonium chloride, (o-methylbenzyl)-triphenylphosphonium bromide, (m-methylbenzyl)-triphenylphosphonium bromide, (p-methylbenzyl)-triphenylphosphonium bromide, (3,3-diphenylpropyl)-triphenylphosphonium bromide, tributyl(p-methyl-benzyl)-phosphonium chloride, triphenylpropylphosphonium bromide, tetrabutylphosphonium chloride, tetrabutylphosphonium iodide, tetrabutyl phosphonium bromide, methyltriphenylphosphonium bromide, methyltriphenylphosphonium iodide, dodecyltriphenylphosphonium bromide, butyltriphenylphosphonium bromide, butyltriphenylphosphonium iodide, (4-methylpentyl)triphenylphosphonium bromide, tetrabutylphosphonium iodide, tributylethylphosphonium iodide, n-amyltriphenylphosphonium bromide, formylmethylenetriphenylphosphorane, formylmethyltriphenylphosphonium chloride, benzoylmethylenetriphenylphosphorane, acetylmethylenetriphenylphosphorane, phenacyltriphenylphosphonium bromide, methoxycarbonylmethylphosphonium bromide, ethyl triphenylphosphoranylideneacetate, methyl triphenylphosphoranylideneacetate, ethoxycarbonylmethylenetriphenylphosphonium bromide, ethyltriphenylphosphonium iodide, (ethyltriphenylphosphonium acetate-acetic acid) complex and the like.

The most preferred component (c1) according to the invention is formylmethyltriphenylphosphonium chloride.

The catalyst component (c2) used according to the invention is a substituted or unsubstituted imidazole compound, benzimidazole compound, dihydropyrimidine compound, tetrahydropyrimidine compound, imidazoline compound or dihydroquinazoline compound or a salt of one of these compounds or a mixture thereof. These compounds may have at most four substituent(s) on the carbon atoms and may also contain substituents on the nitrogen atoms, each of the substituents containing from 1 to 20 carbon atoms.

The only one critical feature of catalysts (c2) is that they be of the class described above. As catalyst (c2), therefore, there can be used the above-mentioned various compounds which have any suitable substituent on the carbon atoms such as alkyl having 1 to 20 carbon atoms and preferably lower alkyl having 1 to 7 carbon atoms such as methyl, propyl, pentyl and the like; amino; monoalkylamino and dialkylamino having 1 to 20 carbon atoms and preferably mono- and di-(lower alkyl)-amino having 1 to 7 carbon atoms such as ethylamino, di-propylamino, hexylamino and the like; phenyl, phenoxy, carboxyl, carbalkoxy having 1 to 20 carbon atoms and preferably carb-(lower alkoxy) having 1 to 7 carbon atoms such as carbmethoxy, carbobutoxy and carbisopropoxy and the like; mercapto; hydroxy; halo such as chloro and bromo; azo; alkanoyl having 1 to 20 carbon atoms and preferably lower alkanoyl having 1 to 7 carbon atoms such as acetyl, propionyl and the like; benzoyl; phenylthio; halophenyl such as p-chlorophenyl, o-bromophenyl and the like; alkylthio having 1 to 20 carbon atoms, preferably lower alkylthio having 1 to 7 carbon atoms such as methylthio, propylthio, pentylthio and the like; cycloalkyl, such as cyclopentyl, cyclohexyl and the like; nitro; alkanoylamino having 1 to 20 carbon atoms, preferably having 1 to 7 carbon atoms such as acetylamino, propionylamino and the like; carbamido; hydroxyalkyl having 1 to 20 carbon atoms, preferably hydroxy-(lower alkyl) having 1 to 7 carbon atoms such as hydroxymethyl, hydroxypropyl, hydroxybutyl and the like; anilino; alkenyl having 1 to 20 carbon atoms, preferably lower alkenyl having 2 to 7 carbon atoms, such as propen-1-yl, buten-2-yl and the like; aralkyl having 7 to 15 carbon atoms, preferably aralkyl having 7 to 12 carbon atoms, such as benzyl, phenethyl, phenylpropyl and the like; alkaryl having 7 to 15 carbon atoms, preferably alkaryl having 7 to 12 carbon atoms such as methylphenyl, 2,4-dimethylphenyl, propylphenyl and the like; alkanoic acid having 2 to 12 carbon atoms, preferably 2 to 7 carbon atoms such as acetic acid, butyric acid and the like. Suitable substituents on the nitrogen atoms may be alkyl, aryl, aralkyl, alkaryl, phenoxy, alkanoyl, carboxy, hydroxyalkyl, —R—NH$_2$, —R—NHR, —R—N(R)$_2$, —R—SH (in these groups, R represents alkyl, phenyl or aralkyl), and the like. In these various substituents, the carbon chains are as defined above.

As representative catalysts (c2) may be mentioned: imidazole, 4-acetaminoimidazole, 5-acetaminoimidazole, 1-acetylimidazole, 4-aminoimidazole, 5-aminoimidazole, 2-(2-aminoetyyl)-imidazole, 5-amino-1-methylimidazole, 1-benzoylimidazole, 2-benzylthioimidazole, 4,5-bis(p-bromophenyl)-imidazole, 2-chloroimidazole, 4-benzylthio-5-nitroimidazole, 5-benzylthio-4-nitroimidazole, 4-bromoimidazole, 5-bromoimidazole, 2-bromo-4,5-diphenyl-imidazole, 2-butylthio-2-cyclohexyl-4,5-diethylimidazole, 1,5-dimethylimidazole, 1-methylimidazole, 2-methylimidazole, 2-ethyl-4-methylimidazole, 2,4-dimethylimidazole, 4-methylimidazole, 1-methyl-4-phenylimidazole, 1-methyl-4-nitroimidazole, 5-nitroimidazole, midoimidazole, 4-carboxamidoimidazole, imidazole, 4,5-dicarboxyimidazole, imidazole-1-ethanol, 2-thioimidazole, 2-acetamino-1-benzylbenzimidazole, 1-acetylbenzimidazole, 2-aminobenzimidazole, 2-(1-aminobutyl)-4-amino-6-ethoxybenzimidazole, 2-amino-1ethylbenzimidazole, 2-amino-1-methylbenzimidazole, 1-benzylbenzimidazole, 2-benzylaminobenzimidazole, 1-benzyl-2-chlorobenzimidazole, 2-benzyl5-nitrobenzimidazole, 2-p-bromobenzylbenzimidazole, 2-butylthiobenzimidazole, 5-chlorobenzimidazole, 6-chlorobenzimidazole, 6-chloro-1,2dimethylbenzimidazole, 5,6-dichlorobenzimidazole, 5,6-dimethylbenzimidazole, 5,6-dinitrobenzimidazole, 2-ethyl-5-nitrobenzimidazole, 1-methylbenzimidazole, 6-methyl-2-phenylbenzimidazole, 6-phenylbenzimidazole, 2-acetamino-N-methylbenzimidazole, benzimidazole-2-acetic , imidazole lactate, imidazolacetate, 3,4-dihydro-4-phenylpyrimidine, 4-methyl-1,4,5,6tetrahydropyrimidine, 3,4-dihydroquinazoline, 2-benzyl-2-imidazoline4-carboxylic acid, 2-(1-naphthylmethyl)-2-imidazoline and 2-chloromethyl-2-imidazoline.

In a preferred embodiment of the present invention, the catalyst (c2) is selected from imidazoles, benzimidazoles, dihydropyrimidines, tetrahydropyrimidines, dihydroquinazolines and imidazolines having 0 to 2 substituents and particularly 0 to 1 substituent. The preferred substituents are lower alkyl, aryl-(lower alkyl), lower alkaryl, aryl, lower alkenyl and lower alkoxy, among which methyl, ethyl, phenyl and vinyl groups are particularly preferred.

In the most preferred embodiment of the invention, the catalyst (c2) is selected from imidazoles and imidazolines. Particularly preferred as catalyst (c2) are imidazole, 1-methylimidazole, 2-methylimidazole, 2-ethyl-4-methylimidazole, 2,4-dimethylimidazole, 2-phenylimidazole, 1-vinyl-2-methylimidazole, 2-methylimidazoline, 2-ethyl-4-methylimidazoline, 2,4-dimethylimidazoline and imidazole lactate. The most preferred catalysts (c2) are 1-methylimidazole and 2-phenylimidazole.

Particularly preferred compositions according to the invention are those wherein the component (a) is diglycidyl ether of 2,2-bis(4-hydroxyphenyl)propane, the component (b) is 2,2-bis(4-hydroxyphenyl)propane, the component (c1) is formyltriphenylphosphonium chloride and the component (c2) is 1-methylimidazole or is 2-phenylimidazole.

In the compositions according to the invention the amount of the component (b) is preferably 0.4 to 2.5, in particular from 0.8 to 1.25, most preferably from 0.85 to 0.95, equivalents per 1 equivalent of component (a) and the amount of the component (c1) is preferably from 0.005 to 5, in particular from 0.01 to 0.1 % by weight and the amount of the component (c2) is from 0.0001 to 0.1, in particular from 0.0002 to 0.04% by weight, respectively, based on the total weight of the epoxy resin (a) and the phenol (b).

Another subject of the invention is a precatalyzed epoxy resin composition comprising an epoxy resin having an average more than one epoxy group per molecule and a small but effective catalytic amount of the combined catalyst consisting of components (c1) and (c2) according to the invention.

A further subject of the invention is an improved process for advancing an epoxy resin having on average more than one epoxy group per molecule with a mononuclear or polynuclear phenol having at least two phenolic hydroxyl groups per molecule to form a solid essentially linear resin at a temperature of about 50° C. to about 225° C., wherein the improvement comprises carrying out the advancement reaction in the presence of a small, but effective catalytic amount of a catalyst which is a combination of (c1) a phosphonium halide or an alkylene phosphorane and (c2) a nitrogen heterocycle selected from the group consisting of substituted or unsubstituted imidazoles, benzimidazoles, imidazolines, dihydropyrimidines, tetrahydropyrimidines, dihydroquinazolines, their salts with organic or inorganic acids and mixtures thereof. A particularly preferred process according to the invention is that, wherein the catalyst is a combination of formylmethyltriphenylphosphonium chloride and 1-methylimidazole or 2-phenylimidazole.

In carrying out the process of the invention other known advancement catalysts, such as for example alkali or alkaline earth metal hydroxides, may be added as catalysts in addition to the combined catalyst comprising component (c1) and (c2) according to the invention.

The advanced epoxy resins prepared according to the invention can be reacted with curing agents to form hard, insoluble, infusible products. Any known curing agent for epoxy resins can be used to obtain crosslinked products by known methods.

The curing of the epoxy resins prepared according to the process of this invention is within the knowledge of the art. Curing is effected at room temperature up to temperatures of between 120 to 300° C. for the appropriate period of time in the presence of a curing agent. The curing agent is utilized in stoichiometric amounts ±50% relative to the epoxy resin, with 1:1 stoichiometry being preferred.

Curing agents that may be used are, for example, aromatic polyamines containing at least three amino hydrogen atoms, such as p-phenylenediamine, m-phenylenediamine, bis(4-aminophenyl)methane, bis(4-aminophenyl)ether, bis(4-aminophenyl)ketone, aniline-formaldehyde resins, bis(4-aminophenyl)sulfone, bis(3-aminophenyl)sulfone and 2,4'-diaminodiphenyl sulfone; polycarboxylic acid anhydrides such as maleic anhydride, succinic anhydride, dodecenylsuccinic anhydride, polyazelaic anhydride, polysebacic anhydride, phthalic anhydride, tetrahydrophthalic anhydride, hexahydrophthalic anhydride, endomethylenetetrahydrophthalic anhydride, hexachloroendomethylenetetrahydrophthalic anhydride and pyromellitic dianhydride; and catalytic hardeners such as dicyanodiamide, semicarbazide and polyhydrazides such as isophthalyl dihydrazide, sebacyl dihydrazide and adipyl dihydrazide.

Upon curing at elevated temperatures, a network of high crosslink density occurs. Accordingly, the expression "cure" as used herein, denotes the conversion of the above epoxide material into insoluble and infusible crosslinked products, with simultaneous shaping to give shaped articles such as castings, pressings or laminates, or to give two-dimensional structures such as coatings, enamels or adhesive bonds.

The polyhydroxy ether obtained according to the present invention can be used in various applications, such as for example, as primer for metals, for the preparation of insulating varnishes by adding, if appropriate, solvents, diluents, tar, fillers, pigments and the like to the polyhydroxy ether. Further, a combined use of the polyhydroxy ether and other resins makes possible the formation of coating films excellent in processability. Further, special emulsions can be prepared by reacting the polyhydroxy ether with methacrylic acid, styrene, ethyl acrylate and the like.

The epoxy resins prepared according to the invention can furthermore be mixed, at any stage before cure, with usual modifiers such as extenders, fillers and reinforcing agents, pigments, dyestuffs, organic solvents, plasticizers, tackifiers, rubbers, accelerators, diluents, and the like. As extenders, reinforcing agents, fillers and pigments which can be employed in the curable mixtures according to the invention there may be mentioned, for example: coal tar, bitumen, glass fibers, boron fibers, carbon fibers, cellulose, polyethylene powder, polypropylene powder, mica, asbestos, quartz powder, gypsum, antimony trioxide, bentones, silica aerogel ("aerosil"), lithopone, barite, titanium dioxide, carbon black, graphite, iron oxide, or metal powders such as aluminum powder or iron powder. It is also possible to add other usual additives, for example, flameproofing agents, agents for conferring thixotropy, flow control agents such as silicones, cellulose acetate butyrate, polyvinyl butyrate, waxes, stearates and the like (which are in part also used as mold release agents) to the curable mixtures.

It is also possible in adhesive formulations, for example, to add rubbers such a carboxyl-terminated acrylnitrilebutadiene rubber, modifying resins such as triglycidyl p-aminophenol and accelerators such as boron trifluoride monoethylamine complexes or imidazole complexes.

The curable mixtures can be manufactured in the usual manner with the aid of known mixing equipment (stirrers, kneaders, rollers and the like).

The invention is further illustrated by the following examples which are not to be construed as limiting the scope thereof. In the examples below, all the "parts" mean "parts by weight".

EXAMPLE 1

In a 500 ml four-necked flask equipped with a thermometer, a stirrer and a heater, 300 parts of bisphenol A diglycidyl ether having an epoxy equivalent of 189 g/eq are heated under a stream of nitrogen gas to elevate the inner temperature of the flask to 70° C. Subsequently, 0.0045 parts of 2-phenylimidazole and 0.184 parts of formylmethyltriphenylphosphonium chloride are added as catalyst, and then the temperature is elevated to 100° C. Then, 161.03 parts of bisphenol A are added, and the temperature is elevated to 180° C. At this temperature, the contents of the flask are reacted for 5 hours. Thus, a polyhydroxy ether is formed. The average molecular weights of the product after 1,3 and 5 hours of reaction, respectively are given below.

|  | $\overline{M}_n$ | $\overline{M}_w$ | $\overline{M}_w/\overline{M}_n$ |
|---|---|---|---|
| 1 hour | 5530 | 15275 | 2.76 |
| 3 hours | 6116 | 18165 | 2.97 |
| 5 hours | 6978 | 22981 | 3.29 |

The epoxy equivalent weights and the mean molecular weights of the product as well as the corresponding data for products of Examples 2 through 10 below are given in Table 1.

EXAMPLE 2

A polyhydroxy ether is formed by carrying out the reaction under the same conditions by the same procedure as in Example 1, except that 0.0028 parts of 2-phenylimidazole and 0.184 parts of formylmethyltriphenylphosphonium chloride are used as the catalyst.

EXAMPLE 3

A polyhydroxy ether is formed by carrying out the reaction under the same conditions by the same procedure as in Example 1, except that 0.0045 parts of 2-phenylimidazole and 0.092 parts of formylmethyltriphenylphosphonium chloride are used as the catalyst.

EXAMPLE 4

A polyhydroxy ether is formed by carrying out the reaction under the same conditions by the same procedure as in Example 1, except that 0.0045 parts of 2-phenylimidazole and 0.046 parts of formylmethyltriphenylphosphonium chloride are used as the catalyst.

EXAMPLE 5

A polyhydroxy ether is formed by carrying out the reaction under the same conditions by the same procedure as in Example 1, except that 300 parts of bisphenol A diglycidyl ether having an epoxy equivalent of 189 g/eq and 158.25 parts of bisphenol A are used as the reactants and 0.0028 parts of 2-phenylimidazole and 0.183 parts of formylmethyltriphenylphosphonium chloride are used as the catalyst.
out the reaction

EXAMPLE 6

A polyhydroxy ether is formed by carrying out the reaction under the same conditions by the same procedure as in Example 1, except that 300 parts of bisphenol A diglycidyl ether having an epoxy equivalent of 189 g/eq and 164.41 parts of bisphenol A are used as the reactants and 0.0028 parts of 2-phenylimidazole and 0.184 parts of formylmethyltriphenylphosphonium chloride are used as the catalyst.

EXAMPLE 7

A polyhydroxy ether is formed by carrying out the reaction under the same conditions by the same procedure as in Example 1, except that 0.0028 parts of 1- methylimidazole and 0.184 parts of formylmethyltriphenylphosphonium chloride are used as the catalyst.

EXAMPLE 8

A polyhydroxy ether is formed by carrying out the reaction under the same conditions by the same procedure as in Example 1, except that 0.00445 parts of 1-methylimidazole and 0.184 parts of formylmethyltriphenylphosphonium chloride are used as the catalyst.

EXAMPLE 9

Into a 500 ml four-necked flask equipped with a thermometer, a stirrer, a refluxing device and a heater are charged 200 parts of bisphenol A diglycidyl ether having an epoxy equivalent of 189 g/eq, 13.67 parts of bisphenol A and 16.5 parts of methyl isobutyl ketone as a solvent together with 0.003 parts of 2-phenylimidazole and 0.25 parts of formylmethyltriphenylphosphonium chloride as the catalyst. After elevating the temperature to 160° C., the contents of the flask are reacted at that temperature for 5 hours. Thus a polyhydroxy ether is formed.

EXAMPLE 10

A polyhydroxy ether is formed by carrying out the reaction under the same conditions by the same procedure as in Example 9, except that 0.021 parts of 2-phenylimidazole and 0.165 parts of formylmethyltriphenylphosphonium chloride are used as the catalyst.

COMPARATIVE EXAMPLE 1

A polyhydroxy ether is formed by carrying out the reaction under the same conditions by the same procedure as in Example 1, except that 0.184 parts of formylmethyltriphenylphosphonium chloride are used as a single catalyst instead of the combination of the two catalytic compounds. The epoxy equivalent weights and the mean molecular weights of the products of Comparative Examples 1 through 11 are given in Table 2.

COMPARATIVE EXAMPLE 2

A polyhydroxy ether is formed by carrying out the reaction under the same conditions by the same procedure as in Example 1, except that 0.092 parts of formylmethyltriphenylphosphonium chloride are used as a single catalyst instead of the combination of the two catalytic compounds.

COMPARATIVE EXAMPLE 3

A polyhydroxy ether is formed by carrying out the reaction under the same conditions by the same procedure as in Example 1, except that 0.046 parts of formylmethyltriphenylphosphonium chloride are used as a single catalyst instead of the combination of the two catalytic compounds.

COMPARATIVE EXAMPLE 4

A polyhydroxy ether is formed by carrying out the reaction under the same conditions by the same procedure as in Example 1, except that 0.184 parts of amyltriphenylphosphonium bromide are used as a single catalyst instead of the combination of the two catalytic compounds.

COMPARATIVE EXAMPLE 5

A polyhydroxy ether is formed by carrying out the reaction under the same conditions by the same procedure as in Example 1, except that 0.0115 parts of sodium hydroxide are used as a single catalyst instead of the combination of the two catalytic compounds.

COMPARATIVE EXAMPLE 6

A polyhydroxy ether is formed by carrying out the reaction under the same conditions by the same procedure as in Example 1, except that 0.045 parts of 2-phenylimidazole are used as a single catalyst instead of the combination of the two catalytic compounds.

COMPARATIVE EXAMPLE 7

A polyhydroxy ether is formed by carrying out the reaction under the same conditions by the same procedure as in Example 1, except that 0.023 parts of 2-phenylimidazole are used as a single catalyst instead of the combination of the two catalytic compounds.

COMPARATIVE EXAMPLE 8

A polyhydroxy ether is formed by carrying out the reaction under the same conditions by the same procedure as in Example 9, except that 0.0314 parts of 2-phenylimidazole are used as a single catalyst instead of the combination of the two catalytic compounds.

COMPARATIVE EXAMPLE 9

A polyhydroxy ether is formed by carrying out the reaction under the same conditions by the same procedure as in Example 9, except that 0.0627 parts of 1-methylimidazole are used as a single catalyst instead of the combination of the two catalytic compounds.

COMPARATIVE EXAMPLE 10

A polyhydroxy ether is formed by carrying out the reaction under the same conditions by the same procedure as in example 9, except that 0.0314 parts of 1-methylimidazole are used as a single catalyst instead of the combination of the two catalytic compounds.

COMPARATIVE EXAMPLE 11

A polyhydroxy ether is formed by carrying out the reaction under the same conditions by the same procedure as in Example 1, except that 0.0045 parts of 2-phenylimidazole are used as a single catalyst instead of the combination of the two catalytic compounds.

TESTS

After heating the reaction mixtures in the above-mentioned examples and comparative examples to the predetermined reaction temperature (180° C. or 160° C., the epoxy equivalents of the polyhydroxy ether products are measured according to the potassium iodide-hydrochloric acid method after reaction time of 1 hour, 3 hours and 5 hours at that temperature. The experimental data obtained as well as the desired (theoretical) epoxy equivalent for each example are shown in the Tables below. The desired, i.e. theoretical epoxy equivalent is the epoxy equivalent that is related to the relative amounts of epoxy resin and phenol used in the advancement reaction. A method of calculating the phenol charge based on the epoxy resin charge, the epoxy value of the starting material and the epoxy value desired in the product is given e.g. in the Encyclopedia of Polymer Science and Engineering, 2nd. Ed., Vol. 6, page 328, Wiley Interscience, New York 1986.

The average molecular weights $\overline{M}_n$ and $\overline{M}_w$ were determined by gel permeation chromatography and the polydispersity $\overline{M}_n/\overline{M}_w$ was calculated therefrom. The results are summarized in Tables 1 and 2.

TABLE 1

| Desired epoxy equivalent (g/eq) | Examples Epoxy equivalent* (g/eq) | | | $\overline{M}_n$ | $\overline{M}_w$ | $\overline{M}_w/\overline{M}_n$ |
|---|---|---|---|---|---|---|
| | 1 | 3 | 5 | After 5-hours reaction | | |
| 1  2600 | 2712 | 2795 | 2902 | 6978 | 22981 | 3.29 |
| 2  2600 | 2350 | 2447 | 2514 | 5756 | 16620 | 2.89 |
| 3  2600 | 2218 | 2618 | 2839 | 6815 | 25593 | 3.76 |
| 4  2600 | 1240 | 2116 | 2701 | 6398 | 26127 | 4.08 |
| 5  2300 | 2281 | 2353 | 2505 | 5179 | 14413 | 2.78 |
| 6  3200 | 2826 | 3069 | 3254 | 6996 | 23157 | 3.31 |
| 7  2600 | 2371 | 2457 | 2527 | 5714 | 17299 | 2.99 |
| 8  2600 | 2683 | 2837 | 2912 | 6936 | 23028 | 3.32 |
| 9  5000 | 3615 | 4700 | 4935 | 9128 | 28067 | 3.08 |
| 10 5000 | 3715 | 4780 | 4980 | 9033 | 28188 | 3.10 |

*After 1, 3 and 5 hours reaction, respectively.

TABLE 2

| Desired epoxy equivalent (g/eq) | Comparative Examples Epoxy equivalent[1] (g/eq) | | | $\overline{M}_n$ | $\overline{M}_w$ | $\overline{M}_w/\overline{M}_n$ |
|---|---|---|---|---|---|---|
| | 1 | 3 | 5 | After 5-hours reaction | | |
| 1  2600 | 2228 | 2335 | 2402 | 5247 | 16258 | 3.10 |
| 2  2600 | 2111 | 2231 | 2249 | 5173 | 18001 | 3.48 |
| 3  2600 | 1076 | 1295 | 1412 | 3544 | 13361 | 3.77 |
| 4  2600 | 2265 | 2374 | 2467 | 5284 | 17014 | 3.22 |
| 5  2600 | 2088 | 2449 | 2592 | 5638 | 25032 | 4.44 |
| 6  2600 | 1063 | —[2] | —[2] | —[2] | —[2] | —[2] |
| 7  2600 | 1604 | 3143 | —[2] | —[2] | —[2] | —[2] |
| 8  5000 | 1940 | 2295 | 2620 | 1899 | 7938 | 4.18 |
| 9  5000 | 4290 | 4860 | 5870 | 6278 | 34226 | 5.45 |
| 10 5000 | 3485 | 3770 | 4065 | 5337 | 27752 | 5.20 |
| 11 2600 | 559 | 1138 | 2246[3] | 4328 | 27135 | 6.27 |

[1]After 1, 3 and 5 hours reaction, respectively,
[2]Missing data in comparative examples 6 and 7 indicated gel formation after 3 or 5 hours reaction, respectively,
[3]Gel formation after 5.5 hours reaction time in comparative example 11.

The following conclusions can be made based on the data presented in the above tables:

The molecular weight of the polyhydroxy ethers prepared in the examples according to the invention is higher than that of the products of the comparative examples and the reaction according to the invention proceeds faster. The desired epoxy equivalent (which is predetermined by the relative proportions of the epoxy resin and the phenol used) can easily be achieved within a short period of time by the process according to the invention, which is not the case for the reactions of the comparative examples. In addition, the degree of polydispersity illustrated by the ratio of $\overline{M}_w/\overline{M}_n$ of an advanced resin of a certain molecular weight is much lower for the resins produced according to the invention than for the products of the comparative examples (e.g. comparison of the product of Example 1 after a 1 hour reaction with the product of Comparative Example 1 after a 5 hours reaction). The process according to the invention results in substantially linear products and no gel formation is observed.

Summarizing it can be said that the preparation of polyhydroxy ethers according to the present invention results in a product having a very high molecular weight, a substantially linear molecular structure and a very sharp molecular weight distribution, i.e. in a product which has hitherto been earnestly desired and has been difficult to realize. The desired product can be produced economically in a very short period of time, owing to the combined use of the above-mentioned catalysts (c1) and (c2).

What is claimed is:

1. A composition which comprises
   (a) an epoxy resin having on average more than one epoxy group per molecule,
   (b) a mononuclear or polynuclear phenol having at least two phenolic hydroxyl groups per molecule and
   (c) a small, but effective catalytic amount of a catalyst which is a combination of
      (c1) a phosphonium halide or alkylene phosphorone and
      (c2) a nitrogen heterocycle selected from the group consisting of
   substituted or unsubstituted imidazoles, benzimidazoles, imidazolines, dihydropyrimidines, tetrahydropyrimidines, dihydroquinazolines, their salts and mixtures thereof.

2. A composition according to claim 1, wherein component (a) is a diglycidyl ether of a dihydric phenol.

3. A composition according to claim 2, wherein component (a) is the diglycidyl ether of 2,2-bis(4-hydroxyphenyl)propane.

4. A composition according to claim 1, wherein component (b) is a bisphenol of the formula

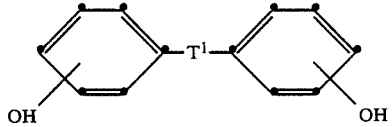

with $T^1$ being a bond between the two phenyl rings, O, S, SO$_2$, NH, CH$_2$ or C(CH$_3$)$_2$.

5. A composition according to claim 4, wherein component (b) is bis(4hydroxyphenyl)methane or 2,2-bis(4-hydroxyphenyl)propane.

6. A composition according to claim 1, wherein component (c1) is a compound of the formulae I or II

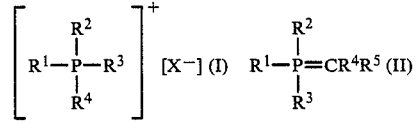

wherein X is a halogen atom, such as chlorine, bromine or iodine, R$^1$, R$^2$ and R$^3$ are the same or different and represent hydrocarbon groups containing from 1 to 25 carbon atoms and R$^4$ and R$^5$ are the same or different and represent a hydrogen atom or a hydrocarbon group containing from 1 to 20 carbon atoms, which hydrocarbon group may optionally contain one or more groups selected from carbonyl groups, carboxylic acid ester groups and carboxylic acid amide groups, and wherein, when each of R$^4$ and R$^5$ represents a hydrocarbon group, R$^4$ and R$^5$ together may form a ring.

7. A composition according to claim 6, wherein R$^1$, R$^2$ and R$^3$ are identical and represent hydrocarbon groups containing 1 to 18 carbon atoms.

8. A composition according to claim 7, wherein R$^1$, R$^2$ and R$^3$ are phenyl.

9. A composition according to claim 6, wherein R$^4$ and R$^5$ independently of one another represent a hydrogen atom or a hydrocarbon group containing from 1 to 10 carbon atoms.

10. A composition according to claim 6, wherein the phosphonium salt of formula I and the alkylene phosphorane of formula II contain a carbonyl group in the +62 -position to the phosphorus carbon bond.

11. A composition according to claim 6, wherein the component (c1) is formylmethyltriphenylphosphonium chloride.

12. A composition according to claim 1, wherein the component (c2) is unsubstituted or is substituted by from 1 to 4 substituents, each of the substituents containing from 1 to 20 carbon atoms.

13. A composition according to claim 12, wherein the substituents on the carbon atoms are selected from the group consisting of alkyl, amino, monoalkylamino, dialkylamino, phenyl, phenoxy, carboxyl, carbalkoxy, mercapto, hydroxy, halo, azo, alkanoyl, benzoyl, phenylthio, halophenyl, alkylthio, cycloalkyl, nitro, alkanoylamino, carbamido, hydroxyalkyl, anilino, alkenyl, aralkyl, alkaryl and alkanoic acid; and the substituents on the nitrogen atoms are selected from the group consisting of alkyl, aryl, aralkyl, alkaryl, phenoxy, carboxy, hydroxyalkyl, —R—NH$_2$, —RNHR, —RN(R)$_2$ and —R—SH, wherein R is aryl, alkyl or 14. A composition according to claim 12, wherein the component (c2) is an imidazole or an imidazoline.

15. A composition according to claim 14, wherein the component (c2) is selected from the group consisting of imidazole, 1-methylimidazole, 2-methylimidazole, 2-ethyl-4-methylimidazole, 2,4-dimethylimidazole, 2-phenylimidazole, 1-vinyl-2-methylimidazole, 2-methylimidazoline, 2-ethyl-4-methylimidazoline, 2,4-dimethylimidazoline and imidazole lactate.

16. A composition according to claim 15, wherein the component (c2) is 1-methylimidazole or is 2-phenylimidazole.

17. A composition according to claim 1, wherein the component (a) is the diglycidyl ether of 2,2-bis(4-hydroxyphenyl)propane, the component (b) is 2,2-bis(4-hydroxyphenyl)propane, the component (c1) is formylmethyltriphenylphosphonium chloride and the component (c2) is 1-methylimidazole or is 2-phenylimidazole.

18. A composition according to claim 1, wherein the amount of the component (b) is from 0.4 to 2.5 equivalents per 1 equivalent of component (a) and wherein the amount of the component (c1) is from 0.005 to 5% by weight and the amount of the component (c2) is from 0.0001 to 0.1% by weight, respectively, based on the total weight of the epoxy resin (a) and the phenol (b).

19. A precatalyzed epoxy resin composition comprising an epoxy resin having an average more than one epoxy group per molecule and a small but effective catalytic amount of (c1) a phosphonium halide or alkylene phosphorone and (c2) a nitrogen heterocycle selected from the group consisting of substituted or unsubstituted imidazoles, benzimidazoles, imidazolines, dihydropyrimidines, tetrahydropyrimidines, dihydroquinazolines, their salts and mixtures thereof.

20. An improved process for advancing an epoxy resin having an average more than one epoxy group per molecule with a mononuclear or polynuclear phenol having at least two phenolic hydroxyl groups per molecule to form a solid essentially linear resin at a temperature of about 50° C. to about 225° C., wherein the improvement comprises carrying out the advancement reaction in the presence of a small, but effective catalytic amount of a catalyst which is a combination of (c1) a phosphonium halide or an alkylene phosphorane and (c2) a nitrogen heterocycle selected from the group consisting of substituted or unsubstituted imidazoles, benzimidazoles, imidazolines, dihydropyrimidines, tetrahydropyrimidines, dihydroquinazolines, their salts with organic or inorganic acids and mixtures thereof.

21. A process according to claim 20, wherein the catalyst is a combination of formylmethyltriphenylphosphonium chloride and 1-methylimidazole or 2-phenylimidazole.

* * * * *